US010199865B2

(12) United States Patent
Nalbant (10) Patent No.: US 10,199,865 B2
(45) Date of Patent: Feb. 5, 2019

(54) HIGH EFFICIENCY WIRELESS POWER SYSTEM (71) Applicant: Integrated Device Technology, Inc., San Jose, CA (US)

(72) Inventor: Mehmet K. Nalbant, Cupertino, CA (US)

(73) Assignee: Integrated Device Technology, Inc., San Jose, CA (US)

(*) Notice: Subject to any disclaimer, the term of this patent is extended or adjusted under 35 U.S.C. 154(b) by 269 days.

(21) Appl. No.: 14/688,835

(22) Filed: Apr. 16, 2015

(65) Prior Publication Data

US 2015/0303709 A1 Oct. 22, 2015

Related U.S. Application Data (60) Provisional application No. 61/980,446, filed on Apr. 16, 2014.

(51) Int. Cl.
| | |
|---|---|
| *H01F 27/42* | (2006.01) |
| *H01F 37/00* | (2006.01) |
| *H01F 38/00* | (2006.01) |
| *H02J 50/10* | (2016.01) |
| *H02J 50/12* | (2016.01) |
| *H02J 5/00* | (2016.01) |
| *H02J 7/02* | (2016.01) |

(52) U.S. Cl.
CPC ............... *H02J 50/10* (2016.02); *H02J 5/00* (2013.01); *H02J 7/022* (2013.01); *H02J 50/12* (2016.02)

(58) Field of Classification Search
CPC . H02J 5/005; H02J 7/025; H02J 17/00; H01F 38/14; B60L 11/182
USPC .......................................................... 307/104
See application file for complete search history.

(56) References Cited

U.S. PATENT DOCUMENTS

| | | | |
|---|---|---|---|
| 8,532,724 | B2 | 9/2013 | Cook et al. |
| 9,438,068 | B2* | 9/2016 | Wakabayashi .......... H02J 17/00 |
| 2004/0257222 | A1 | 12/2004 | Bentley |
| 2006/0172782 | A1 | 8/2006 | Planning et al. |
| 2010/0109443 | A1* | 5/2010 | Cook .................... H01Q 1/2225 307/104 |
| 2010/0148723 | A1* | 6/2010 | Cook .................... G06K 7/0008 320/108 |
| 2010/0181961 | A1 | 7/2010 | Novak et al. |
| 2012/0306284 | A1* | 12/2012 | Lee ........................ H02J 17/00 307/104 |
| 2013/0069585 | A1 | 3/2013 | Kamata |

(Continued)

FOREIGN PATENT DOCUMENTS

WO WO2013136464 9/2013

OTHER PUBLICATIONS

International Search Report for PCT Application No. PCT/US2015/026243 dated Jul. 16, 2015, pp. 1-2.

(Continued)

*Primary Examiner* — Quan Tra (74) *Attorney, Agent, or Firm* — Haynes and Boone, LLP.

(57) ABSTRACT

In accordance with some embodiments, a transmitter for wireless transfer includes a rectifier that receives an AC voltage and provides a DC voltage; a capacitor that receives and smooths the DC voltage; a regulator that receives the DC voltage and outputs an input voltage; and a wireless transmitter that receives the input voltage and transmits wireless power.

20 Claims, 12 Drawing Sheets

(56) References Cited

U.S. PATENT DOCUMENTS

| | | | |
|---|---|---|---|
| 2013/0106198 A1* | 5/2013 | Kuk | H01F 38/14 |
| | | | 307/104 |
| 2013/0214611 A1 | 8/2013 | Bae | |
| 2013/0249479 A1 | 9/2013 | Partovi | |
| 2014/0097697 A1 | 4/2014 | Cho | |
| 2014/0247020 A1* | 9/2014 | Stankovic | A61F 2/10 |
| | | | 320/166 |
| 2014/0361628 A1* | 12/2014 | Huang | H01F 38/14 |
| | | | 307/104 |
| 2015/0028694 A1* | 1/2015 | Leabman | H02J 17/00 |
| | | | 307/149 |
| 2015/0200562 A1* | 7/2015 | Kilinc | A61B 5/0031 |
| | | | 320/108 |
| 2015/0280452 A1* | 10/2015 | Nalbant | H02J 5/005 |
| | | | 307/104 |
| 2016/0233711 A1* | 8/2016 | Miller | H02J 7/0054 |

OTHER PUBLICATIONS

Written Opinion of the International Searching Authority for PCT Application No. PCT/US2015/026243 dated Jul. 16, 2015, pp. 1-5.
U.S. Appl. No. 14/671,444, filed Mar. 27, 2015.

* cited by examiner

HIGH EFFICIENCY WIRELESS POWER SYSTEM

RELATED APPLICATIONS

The present application claims priority to U.S. Provisional Application Ser. No. 61/980,446, filed on Apr. 16, 2014, which is herein incorporated by reference in its entirety.

BACKGROUND

1. Technical Field

The present disclosure relates to wireless power transmission systems and, in particular, to high efficiency wireless power systems.

2. Discussion of Related Art

Figure 1A:
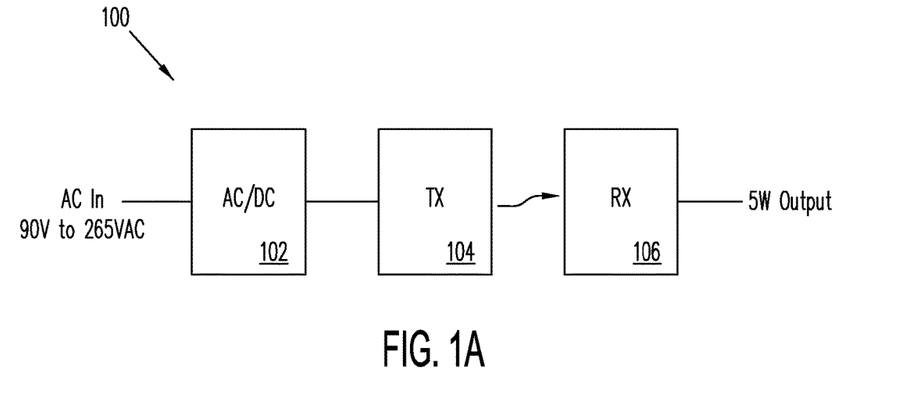
FIGS. 1A and 1B illustrate a conventional wireless transmission system.
Figure 1B:
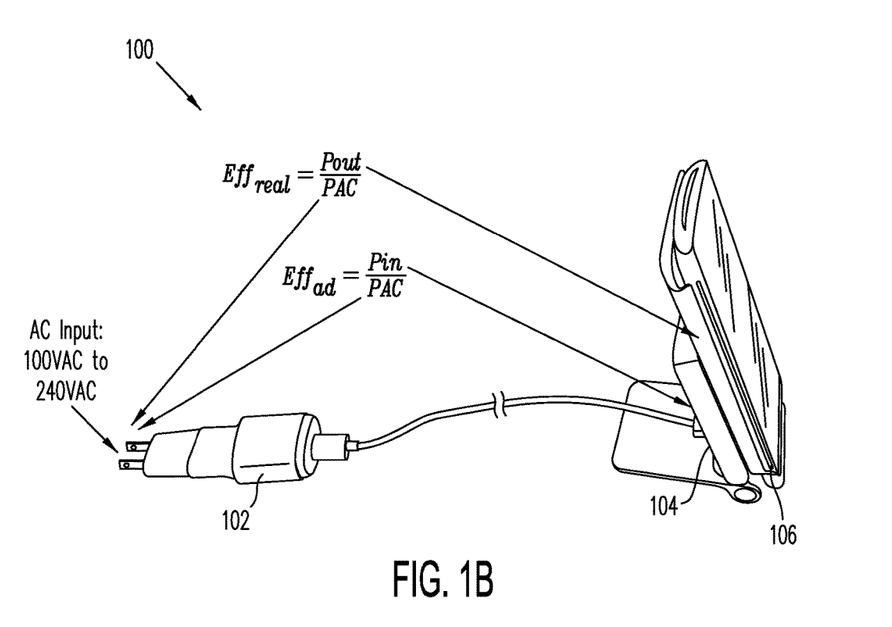

Most wireless power systems use voltage-fed power stages that are, for example, consistent with the WPC qi standard or other wireless standards. These systems utilize either a half or full-bridge switching technologies. Typically, these implementations, as shown in system 100 illustrated in FIG. 1A, include an AC/DC power supply 102 that is connected to the AC main lines. Customary universal input voltage ranges vary from about 90 VAC to about 265 VAC at 50 or 60 Hz. Typically AC/DC power supply 102 includes a transformer and rectifier to produce a DC voltage, for example 5V, that is then used by the wireless power transmitter 104 to transmit power to the wireless power receiver 106. Safety regulations typically require that the output of the AC/DC power supply 102 be galvanically isolated from the AC mains for safety. This requires a safety rated transformer to be used in such power supplies, which decreases the efficiencies of these systems. FIG. 1B illustrates a system 100 as shown in FIG. 1A.

Typically, efficiencies for wireless transmitters are calculated from the wireless transmitters themselves. The wireless transmitter efficiency is typically calculated as $$Eff_{TxRx} = \frac{Pout}{Pin}$$

where Pout is the output power provided by the wireless power receiver 106 and Pin is the power received by the wireless power transmitter 104. This definition of power efficiency, however, is clearly inadequate and incomplete as it completely ignores the efficiency of AC/DC power supply 102 or any cabling, such as a USB cable, or other connector losses in system 100. In order to provide accurate efficiency standards, the overall efficiency from AC input to RX output has to be considered and that efficiency should be high. Consequently, the efficiency of the AC/DC power supply 102, which can be given by $$Eff_{ad} = \frac{Pin}{PAC}$$

where PAC is the input AC power, needs to be considered.

Typical efficiencies in AC/DC power supply 102 is between about 72-78%. This is often due to low adapter DC voltage output and more than 1 A current for 5 W delivery of power. Cable and connector losses can add up to 3% or more. The typical efficiency of the wireless power transceiver system formed by power transmitter 104 and power receiver 106 is about 72-75% in a conventional 5 W system wireless power transmission system. Consequently, the overall efficiency of a conventional system 100 is given by the multiple of the two ($Eff_{real}=Eff_{ad} \cdot Eff_{TxRx}$), or about 54%.

Therefore, there is a need for better efficiency systems for transmitting power wirelessly.

SUMMARY

In accordance with some embodiments, a transmitter for wireless transfer includes a rectifier that receives an AC voltage and provides a DC voltage; a capacitor that receives and smooths the DC voltage; a regulator that receives the DC voltage and outputs an input voltage; and a wireless transmitter that receives the input voltage and transmits wireless power.

These and other embodiments will be described in further detail below with respect to the following figures.

BRIEF DESCRIPTION OF THE DRAWINGS

FIG. 3 (including FIGS. 3A and 3B) illustrates a wireless transmission system according to some embodiments.

FIG. 5 (including FIGS. 5A and 5B) illustrates another example of a wireless transmission system according to some embodiments.

The drawings may be better understood by reading the following detailed description.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Efficiency can be improved in wireless transmission systems by improving the efficiency of the AC/DC power source and by improving the efficiency of the wireless transmitters and wireless receivers. Accordingly, some embodiments of the present invention include an AC/DC power rectifier with a high voltage buck regulator followed by a wireless transmitter with a current fed power stage. The buck regulator has an output inductor, where the current fed power stage has one or more inductors depending on the embodiment of current fed power transmitters. Current fed wireless power transmitters are described in detail in U.S. application Ser. No. 14/671,444, filed on Mar. 27, 2015, which is herein incorporated by reference in its entirety. As stated in that application, one can use "an Adaptive Resonant (AR) operation. In AR operation, the power circuit, with all the resonant components (inductors, capacitors, resistors and other loads) connected to its switching nodes, self-determines its natural resonate frequency and operates at the frequency for a substantial time of its operation. The AR circuit is applicable in wireless power transfer among other types of power transfer. For example, some embodiments of AR transceivers increases the efficiency of the transceiver system by more than 10% (DC to DC transfer) when compared to the best alternative technologies. Therefore, a wireless power transmission system according to some embodiments can exhibit high efficiency, efficient power control, and are conducive to power circuit implementations."

A system according to some embodiments, then, can include a bridge rectifier followed by a reservoir capacitor to smooth out the rectified 50 Hz or 60 Hz AC voltage, then the high voltage buck regulator steps the rectified voltage down to a lower voltage that can be controlled and applied to the power input of a current-fed wireless power transmitter.

In some embodiments, the wireless power transmitter and the power rectifier can be placed in an insulating case, which provides the safety isolation. Consequently, a less efficient safety isolation transformer is not used in the system, further increasing the overall efficiency. Consequently, AC power can be directly brought into the insulating case or the AC plug can be integrated into the insulating case, which can also eliminate cable loss.

Figure 8:
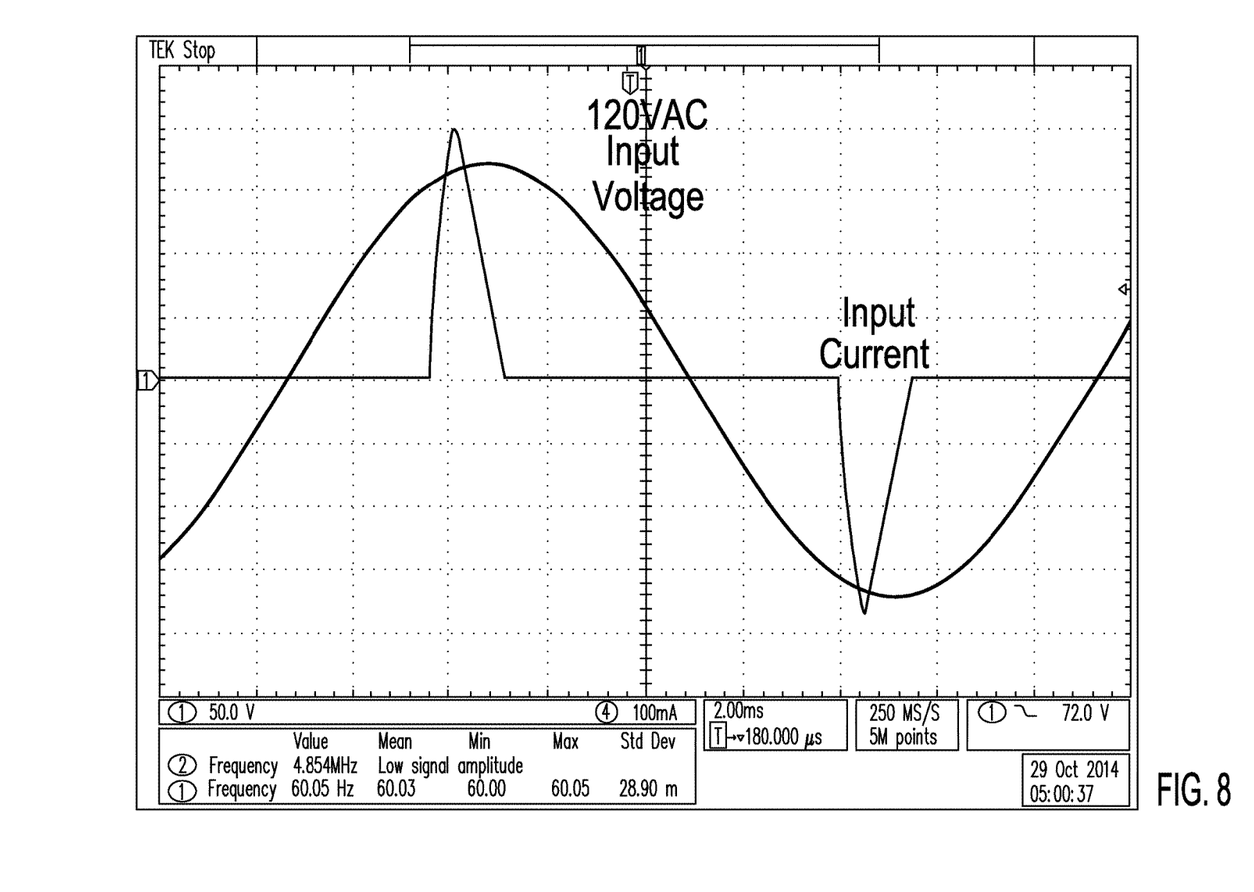
FIG. 8 illustrates typical voltage and current inputs to a wireless system according to some embodiments.

In AC/DC conversion systems, the AC input voltage is sinusoidal with a frequency of between 50 Hz and 60 Hz. However, the input current can be non-Sinusoidal. Non-sinusoidal currents are typical of bridge rectifier input switching power supplies. An example of the AC input is illustrated in FIG. 8, where a sinusoidal voltage is shown and a non-sinusoidal current is indicated. The input power PAC, then, should be measured with a true power meter and is given by $$PAC = \frac{1}{T} \int_0^T V_{ac}(t) i_{ac}(t) dt$$

where T is one period of the frequency, $V_{ac}(t)$ is the voltage, $i_{ac}(t)$ is the current, and t represents time.

With one example, with an RX output power of 4.2 W using a conventional voltage-fed wireless transmitter a typical input AC power PAC can be 8.25 W. In some embodiments of the present invention, with a AC/DC rectifier according to some embodiments and a current-fed wireless transmitter, the input AC power PAC can be reduced, for example to 6.5 W. This represents a 13% improvement in efficiency with some embodiments.

Further, since some costly components are not used in some embodiments, the cost of manufacturing some embodiments of the present invention can be significantly reduced. For example, embodiments of the present invention (direct AC transmitter or DAC TX) may not include an AC adaptor case with an AC/DC isolation transformer, may use a simpler AC cable and not USB cables or the such, and may operate at lower currents resulting in lower rated rectification and TX coil diameters. At least these factors may result in lower costs for manufacture of a DAC TX unit according to some embodiments.

Figures 2A, 2B:
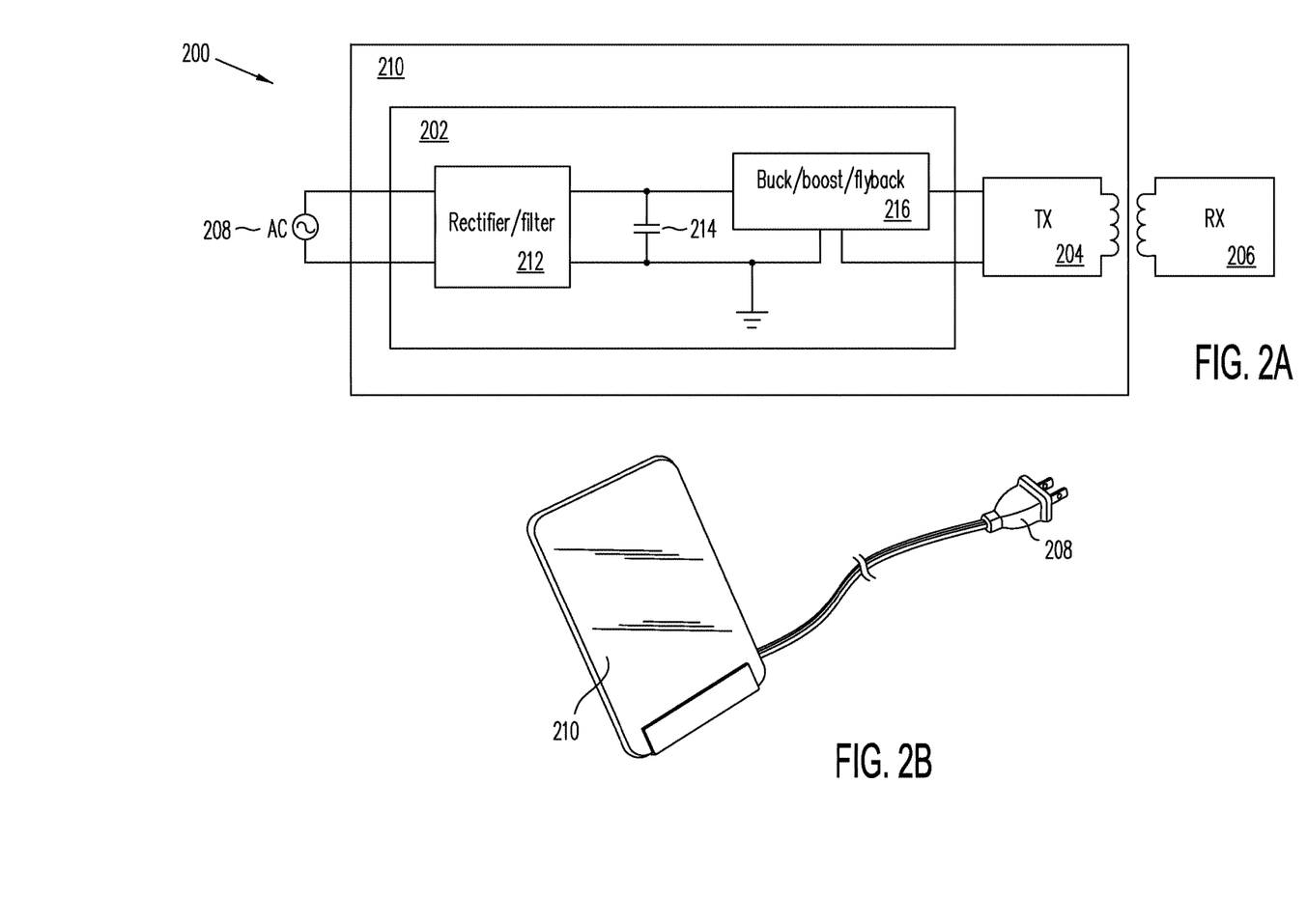
FIGS. 2A and 2B illustrate a wireless transmission system according to some embodiments.

FIGS. 2A and 2B illustrate a system 200 according to some embodiments. As shown in FIG. 2A, system 200 includes a power rectifier 202 coupled to receive AC power 208. Power rectifier 202 supplies DC power that, through transmitter 204, can be wirelessly transmitted to receiver 206. As illustrated in FIG. 2A, power rectifier 202 includes rectifiers 212 and smoothing capacitor 214. A DC voltage produced by rectifiers 212 are input to buck/boost/flyback circuit 216, which regulates the voltage provided to transmitter 204. As is further shown in FIGS. 2A and 2B, power rectifiers 202 and transmitter 204, which forms the DAC TX, is enclosed in an insulating, for example plastic, case 210. Insulating case 210 provides safety isolation and therefore an isolation transformer need not be used.

Figure 3A:
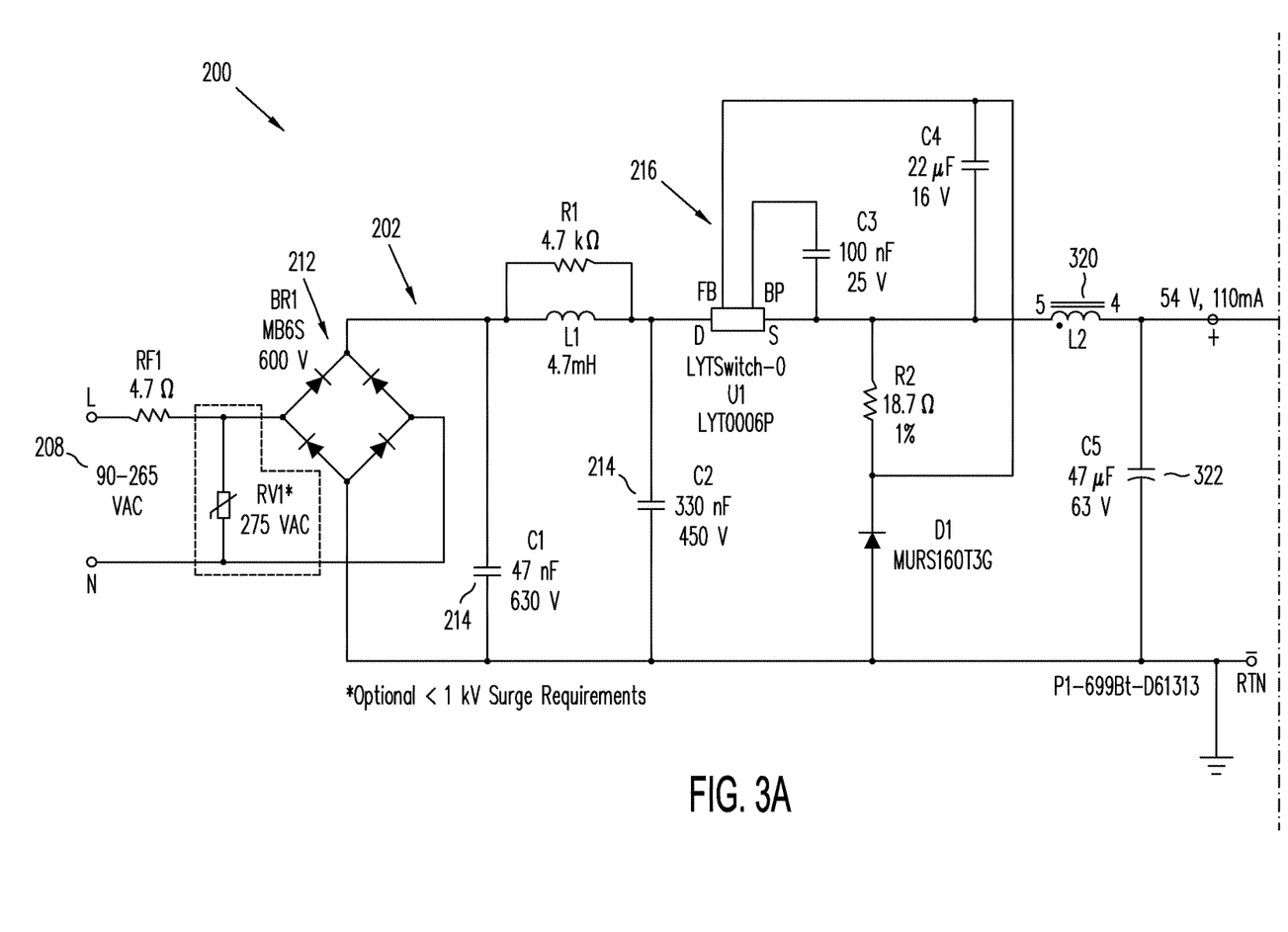

FIG. 3 illustrates an embodiment of system 200 in more detail. As illustrated, rectifier 212 is formed of a diode bridge. Capacitor 214 is formed by two capacitors, C1 and C2, and an inductor L1. Buck/boost 216 can include, for example, a Power Integrations LYT0006P chip, although other buck regulators of varying degrees of integration can be used, formed with surrounding circuitry. Power rectifier 202, with the LYT0006P chip, can provide a regulated 54V at 110 mA to transmitter 204. As described in more detail in U.S. application Ser. No. 14/671,444 (which has been incorporated by reference above), an embodiment of transmitter 204 includes an inductor that receives power from power rectifier 202 and is coupled to a center tap of TX coil 310. A capacitor 308 is coupled across TX coil 310. A power FET 304 is coupled between a first side of capacitor 308 and ground. Power FET 306 is coupled between a second side of capacitor 308 and ground. The gates of FETs 304 and 306 are driven to provide AC current through TX coil 310. In some embodiments, FETs 304 and 306 are driven in an adaptive self-resonance mode.

As is further illustrated in FIG. 3, receiver 206 includes RX coils 312 with a center tap coupled to capacitor 318, which provides the output voltage to a load 320. One side of RX coil 312 is coupled through FET 314 to ground while the opposite side of RX coil 312 is coupled through FET 316 to ground. The gates of FETs 314 and 316 can be driven, as is the gates of transistors 304 and 306, in adaptive self-resonance mode. In some embodiments, FETS 314 and 316 can be replaced by diodes.

Figure 3B:
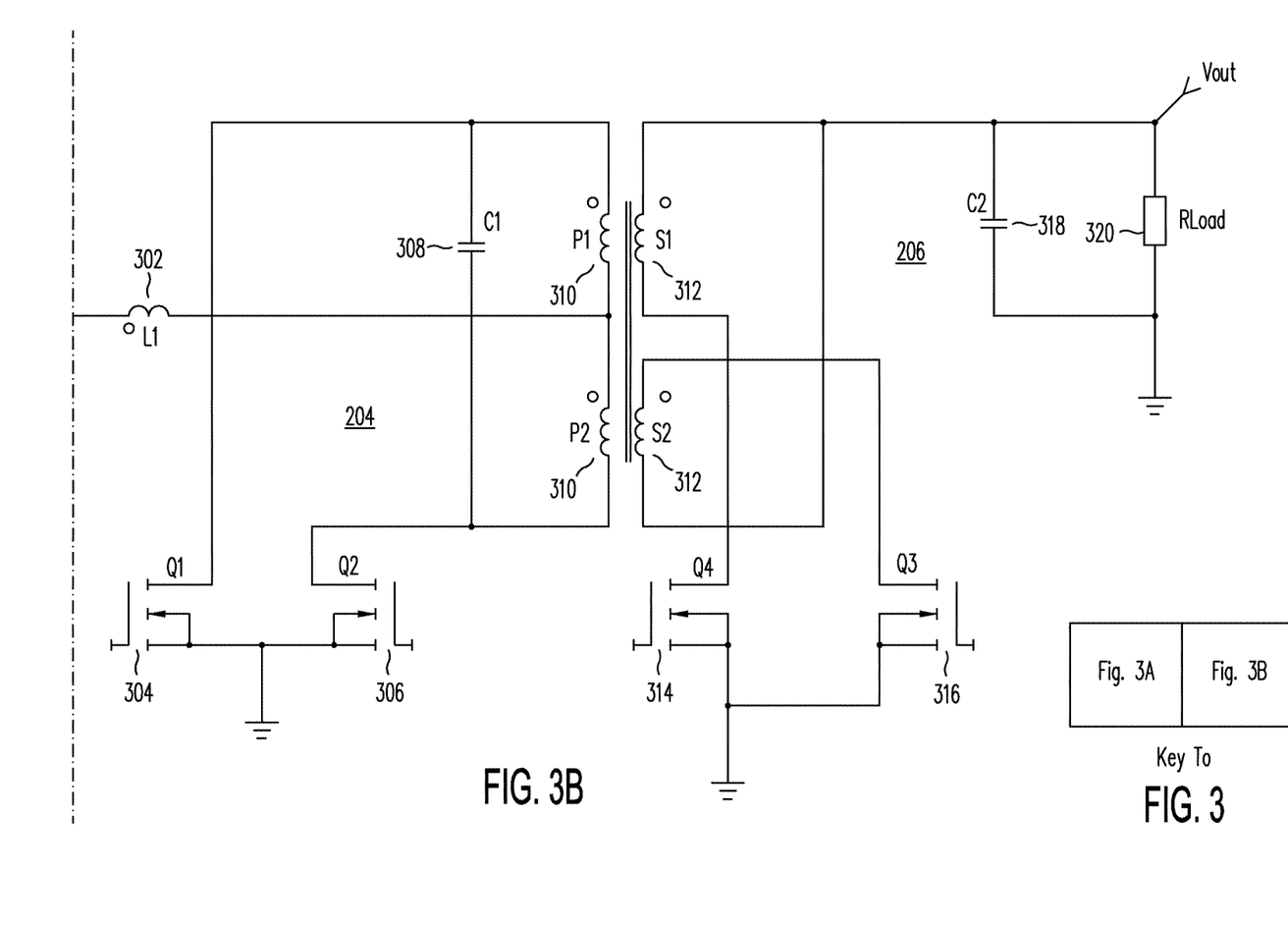

As is illustrated in FIG. 3B, the current path only passes through one FET transistor. In the particular example shown in FIG. 3B, transistor 306 may be on and transistor 304 may be off at a given time. Although a controller can drive switching transistors 306 and 304 at any frequency, in some embodiments the controller operates in AR mode. In AR mode, switching transistors 306 and 304 are switched when the voltage on the drain decreases to zero volts, which is also in line with zero voltage switching (ZVS) operation.

Figure 9:
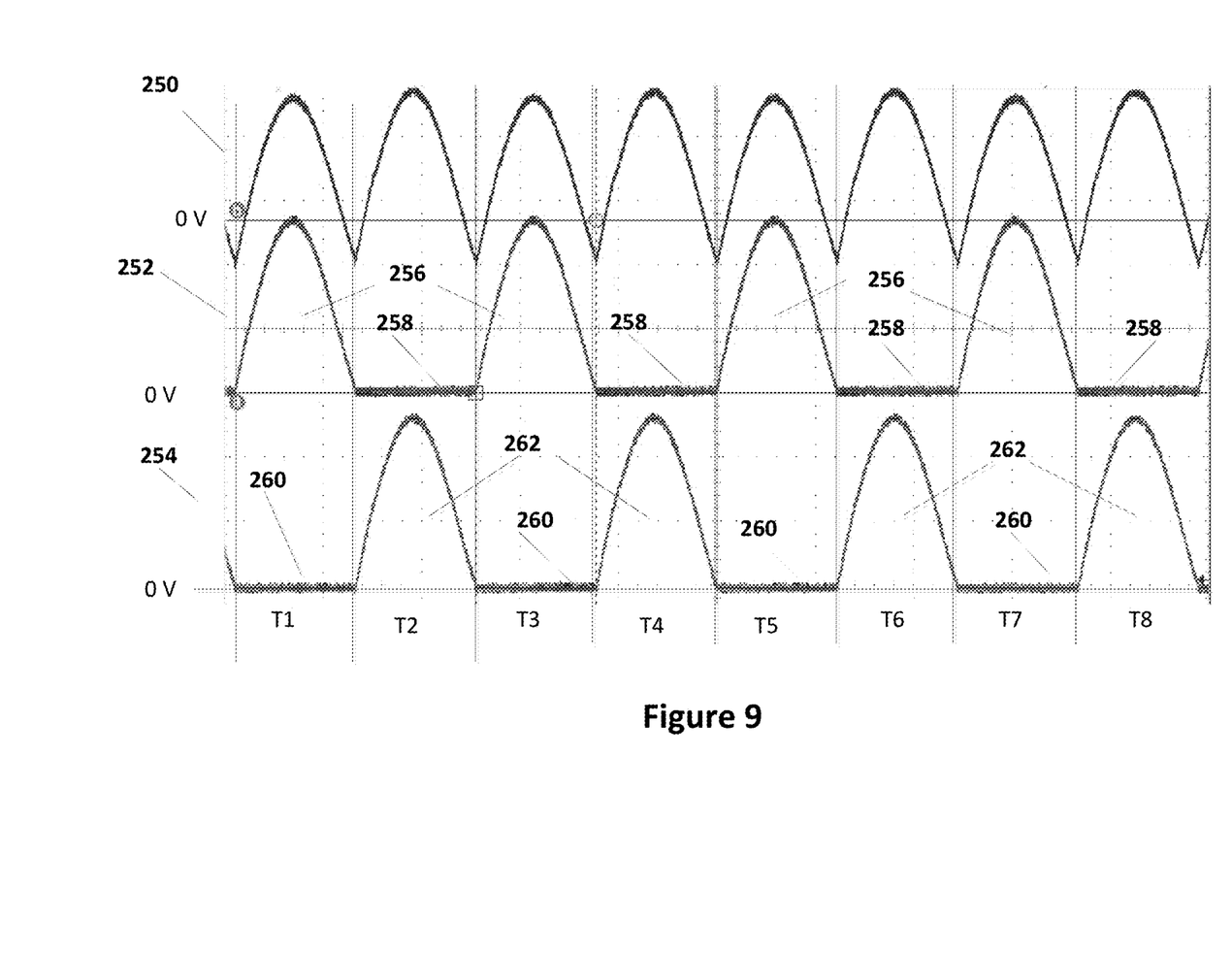
FIG. 9 illustrates operation of a wireless transmitter as shown in FIG. 3B.

FIG. 9 illustrates operation of an example transmitter 204 in AR mode. Waveform 250 illustrates the voltage on center-tap of TX coil 310 in TX 204. Waveform 252 is the voltage at a node corresponding to the drain of FET 306, in TX 204. Waveform 254 is the voltage at a node corresponding to the drain of FET 304, in TX 204. As shown in waveforms 254 and 252, switching of FETs 304 and 306 occur at 0 crossings of the voltage on the drain of FETs 304 and 306. As shown in FIG. 9, waveform 252 shows time periods 256 where FET 306 is off and periods 258 where FET 306 is on (driving the voltage at the drain of FET 306 to ground). Similarly, waveform 254 shows periods 260 where FET 304 is on (driving the voltage at the drain of transistor 304 to ground) and periods 262 when FET 304 is off. Consequently, in periods T1, T3, T5, and T7, FET 304 is on and FET 306 is off and in periods T2, T4, T6, and T8, FET 304 is off and FET 306 is on. In an AR mode, time period T1 switches to time period T2 when waveform 252 reaches 0 volts. Time period T2 switches to time period T3 when waveform 254 reaches 0 volts. The controller monitors the voltages of waveforms 252 and 254 and switches FETs 304 and 306 when the voltage across the off transistor transitions to 0 V. Waveform 250 shows the resulting voltage at the center tap of TX coil 310. Since the time periods are determined by the resonance of the system, transmitter 204 then operates substantially at resonant frequency.

Buck regulator 216 can control power flow into transmitter 204. In some cases, power flow can be controlled by affecting changing in a Pulse-width modulator duty cycle in buck regulator 216. Also, in order to reduce or eliminate electromagnetic interference (EMI), various filters may be used in power rectifier 202. Such a filter may be formed, for example, by inductor 320 and capacitor 322 at the output of power rectifier 202.

As illustrated in FIG. 3 and FIG. 9, AR enables the power stages to operate at the equivalent resonant frequency of the reactive components connected to the drains of the two power FETs Q1 and Q2 (shown as FETs 304 and 306 in FIG. 3). Adaptive self-resonance (AR) is advantageous as it allows the power FETs (FETs 304 and 306 in FIG. 3) to operate under substantially zero-voltage switching conditions that in turn substantially eliminate switching power losses and result in substantially lower electro magnetic interference (EMI) generation. The waveforms at the drains of the power FETs (FETs 304 and 306 in FIG. 3) look sinusoidal for a substantial part of their respective switching cycles, until the FETs are turned on as illustrated in FIG. 3. In some embodiments, the AR is accomplished with voltage feedback from the drains of the power FETs, however other feedback points may be utilized as well.

Figure 4:
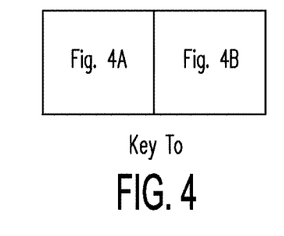
FIG. 4 (including FIGS. 4A and 4B) illustrates a wireless transmission system according to some embodiments.
Figure 4A:
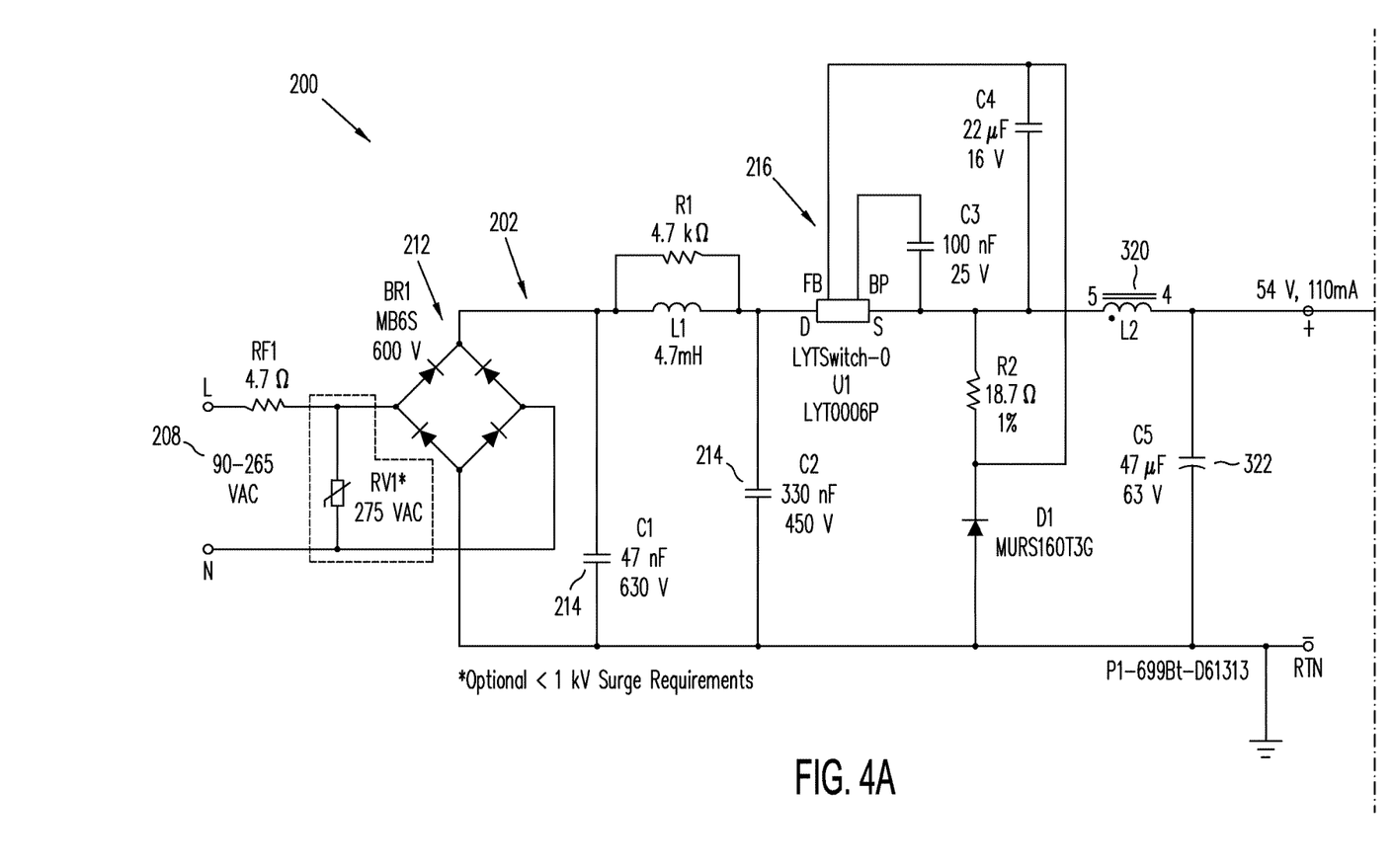
Figure 4B:
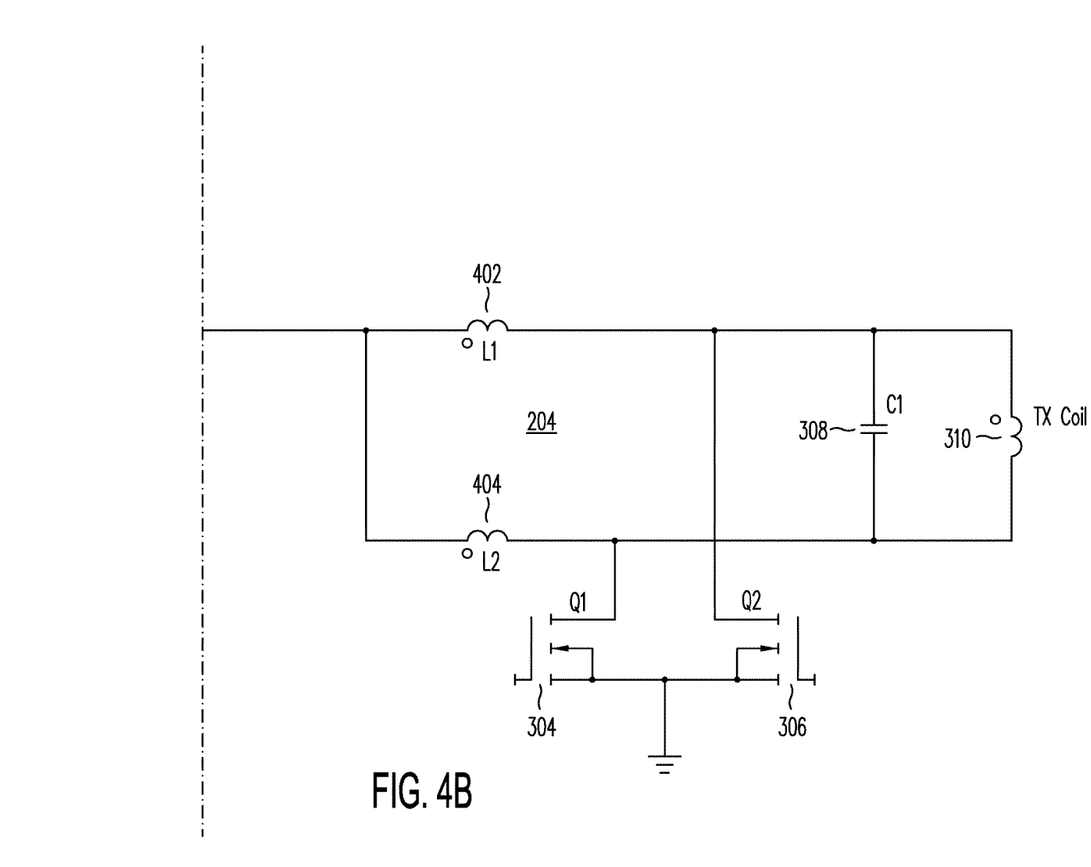

FIG. 4 illustrates power rectifier 202 supplying power to another embodiment of transmitter 204. As shown in FIG. 4, TX coil 310 does not include a center tap and power from power rectifier 202 is provided through inductors 402 and 404 to opposite sides of TX coil 310. Switching power FETs 304 and 306 can be driven at a particular frequency or may be operated in adaptive resonance mode, as is described above.

As shown above, in either half bridge or full bride operation of transmitter 204, power delivery can be controlled by varying the frequency of with the bridge or by varying the output voltage of buck regulator 216, or both.

Figures 5, 5B:
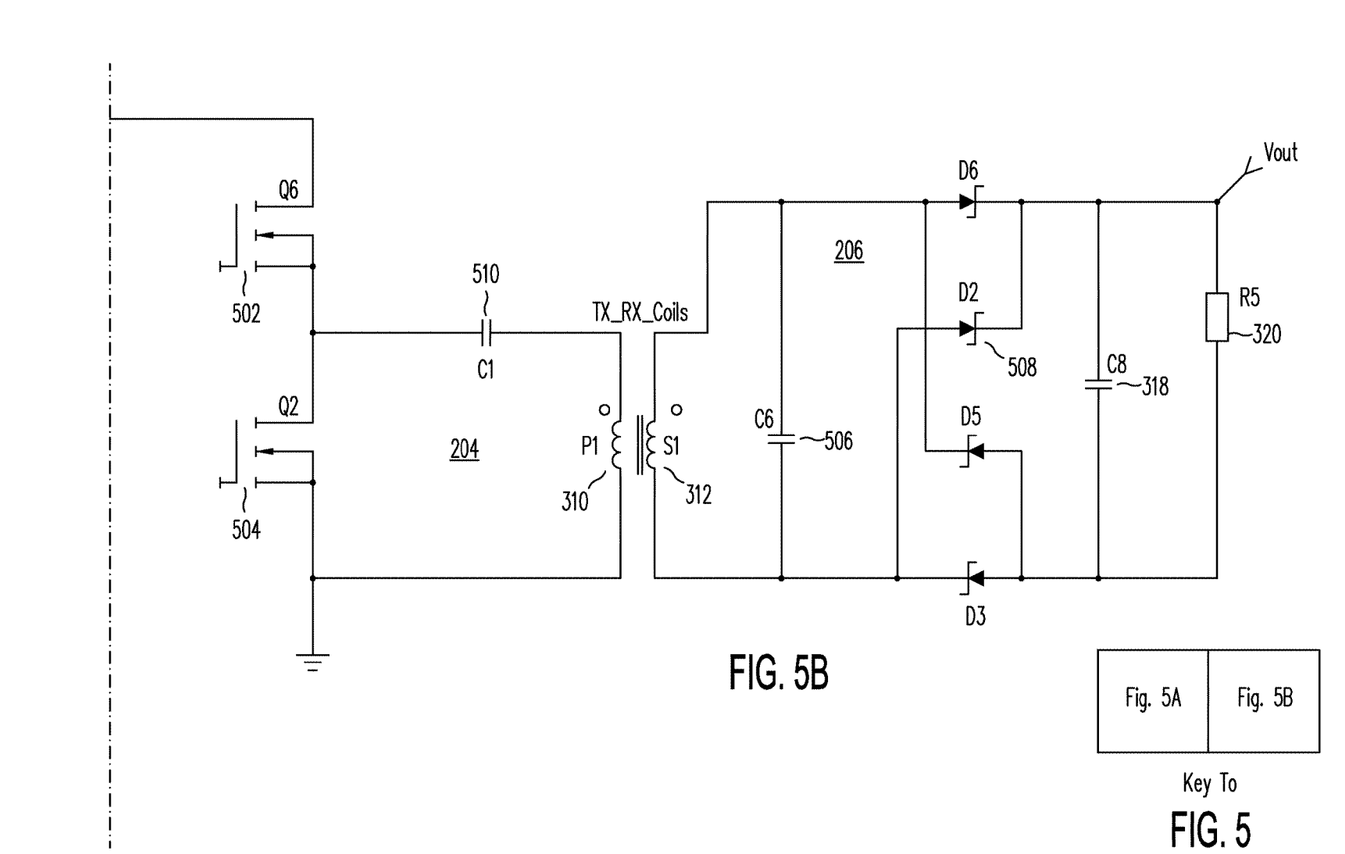
Figure 5A:
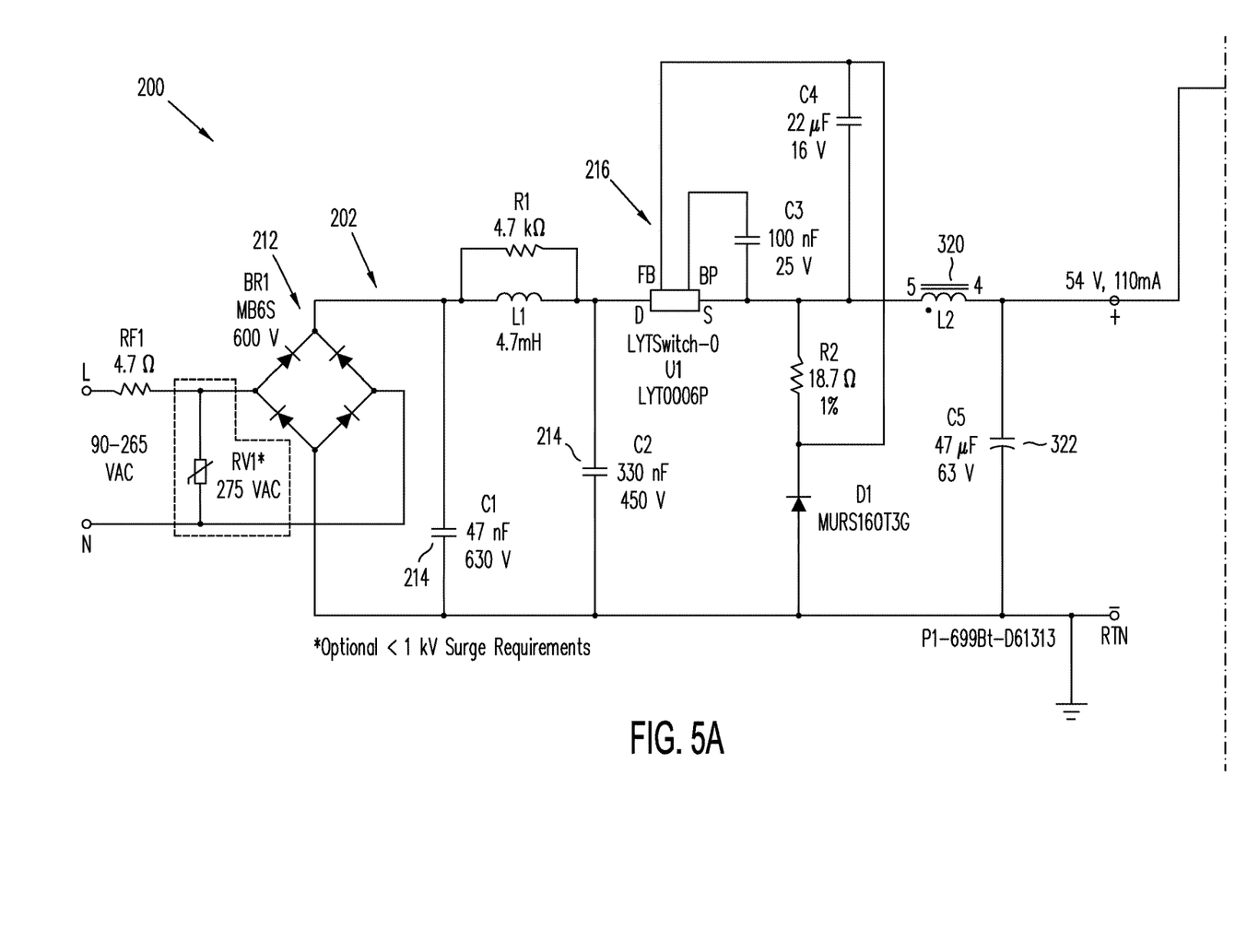

FIG. 5 illustrates another example of a system 200 according to some embodiments. As shown in FIG. 5, the output power from power rectifier 202 is input to the drain of FET 502. The source of FET 502 is coupled to the drain of FET 504 and the source of FET 504 is coupled to ground. Capacitor 510 is coupled between the drain of FET 504 (and the source of FET 502) and one side of TX coil 310. The opposite side of TX coil 310 is coupled to ground. The gates of FETs 502 and 504 can be driven to provide an AC voltage across TX coil 310. Receiver 206 receives the power in RX coil 302. A capacitor 506 is coupled across RX coil 312. A rectifier bridge 508 is also coupled across RX coil 312. Capacitor 318, coupled across rectifier bridge 508, then supplies the output voltage Vout to load 320.

Figure 6:
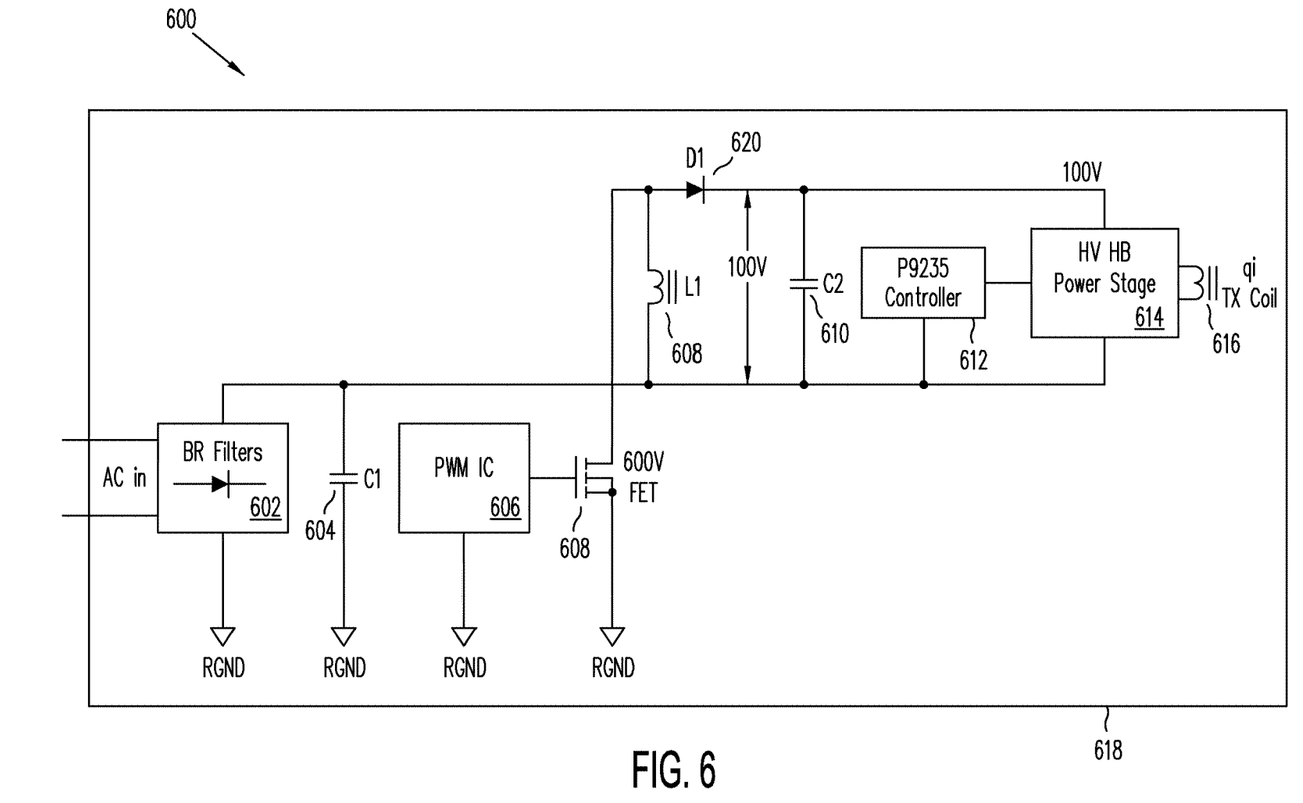
FIG. 6 illustrates another example of a wireless transmission system according to some embodiments.

FIG. 6 illustrates a system 600 according to some embodiments. As shown in FIG. 6, power is received into rectifier/filter 602. Rectifier/filter 602 can include to bridge rectifier to receive AC power (90 to 265 V, 50-60 Hz, AC power). Rectifier/filter 602 may further include filters, reservoirs or smoothing capacitors, and a buck or step down switching regulator to provide a substantially DC voltage. The substantially DC voltage is then applied across capacitor 604. A first side of an inductor 608 and a first side of a capacitor 610 are coupled to the DC voltage on capacitor 604. A second side of inductor 608 and a second side of capacitor 610 are further coupled through diode 620. The second side of inductor 608 is coupled through FET 608 to ground. The gate of FET 608 is driven by a pulse-width modulator (PWM) 606. Consequently, PWM 606, FET 608, inductor 608, diode 620 and capacitor 610 form a boost circuit that may result in a voltage of 100 V at the second side of capacitor 610. A high voltage (HV) half-bridge (HB) or full bridge (FB) power stage 614 can be placed between the second side of capacitor 610 and the DC voltage from capacitor 604. Power stage 614 can be driven by a controller 612, which operates the switches in power stage 614. In some examples, controller 612 can be an IDT 9235 or 9236 controller. Power from power stage 614 is then applied to TX coil 616.

As discussed above, power stage 614 can be driven according to a standard such as the WPC qi standard. However, in some embodiments, as discussed above, power stage 614 can be driven in adaptive resonance mode.

Figure 7A:
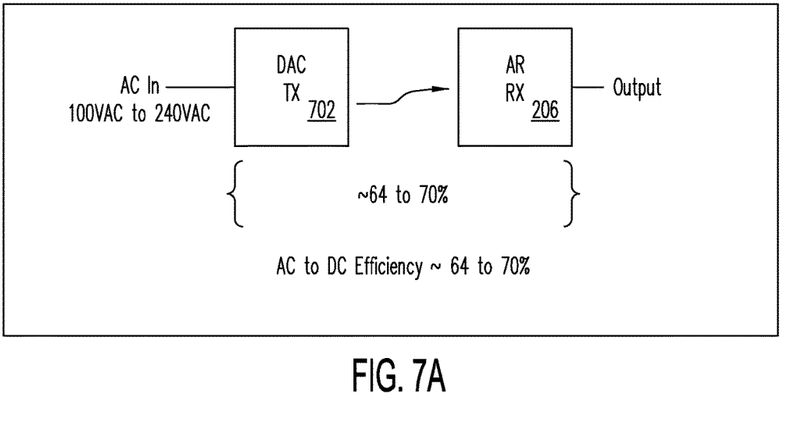
FIGS. 7A and 7B illustrate the efficiencies of systems according to some embodiments.
Figure 7B:
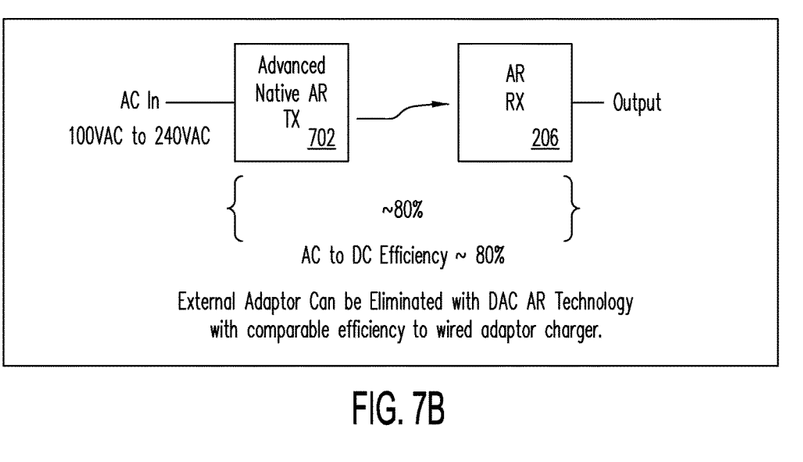

FIG. 7A illustrates the efficiencies of some embodiments such as those described above. As shown in FIG. 7A, a direct AC conversion transmitter 702 is coupled to a receiver 206. Transmitter 702 can, for example, be the combination of power rectifier 202 and 204 as illustrated in FIGS. 2A, 3, 4, and 5 or it may be system 600 shown in FIG. 6. As illustrated in FIG. 7A, the overall efficiency demonstrated by some embodiments is approximately 64 to 70%. If transmitter 702 is operating in adaptive resonance mode, then as shown in FIG. 7B, the efficiency may be as high as 80%.

As described above, transmitter 702 receives AC power directly from a wall plug, which may be 90 to 260 V of 50 to 60 Hz AC voltage. Further, transmitter 702 includes a bridge rectifier to rectify the AC voltage. A reservoir, filter, and/or smoothing capacitor is provided at the bridge rectifier. A buck or other step down switching regulator is connected to the filter capacitor. A voltage fed half-bridge or full bridge power stage or a current fed power stage can be used to drive a TX coil for wireless transfer. In some cases, control circuits such as IDT's 9235 or 9236 controllers or other types of controllers can be used to drive the power stage.

In the detailed description above, specific details have been set forth describing certain embodiments. It will be apparent, however, to one skilled in the art that the disclosed embodiments may be practiced without some or all of these specific details. The specific embodiments presented are meant to be illustrative but not limiting. One skilled in the art may recognize other system or method that, although not specifically described herein, is still within the scope and spirit of this disclosure.

What is claimed is:

1. A transmitter for wireless transfer, comprising:
a rectifier that receives an AC voltage and provides a DC voltage;
a first capacitor that receives and smooths the DC voltage;
a regulator that receives the DC voltage and outputs a regulated DC voltage; and
a wireless transmitter that receives the regulated DC voltage and transmits wireless power, the wireless transmitter comprising:
a transmitting coil with a center tap, a first side, and a second side;
an inductor coupling the input voltage to the center tap;
a second capacitor coupled between the first and second side;
a first switch, coupled between the first side and ground;
a second switch, coupled between the second side and ground; and
a controller that is configured to operate the first and second switches in an adaptive self-resonance mode when the wireless transmitter is coupled to and transmits power to a wireless receiver that operates in the adaptive self-resonance mode;
wherein in the adaptive self-resonance mode, in each period of time of a plurality of successive periods of time, one of the first and second switches is on and the other one of the first and second switches is off, and a voltage across the other one of the first and second switches becomes non-zero in the period of time but returns to zero by the end of the period of time;
wherein the voltages across both of the first and second switches are zero at the end of each said period of time; and
wherein the first and second switches are both switched by the controller at the end of each said period of time, when the voltages across both of the first and second switches are zero.

2. The transmitter of claim 1, wherein the rectifier includes a diode rectifier bridge and one or more filters.

3. The transmitter of claim 1, wherein the regulator is a buck/boost/flyback regulator that provides an input voltage to the wireless transmitter that is lower voltage than the DC voltage.

4. The transmitter of claim 1, wherein the regulator includes a boost circuit that produces the input voltage greater than the DC voltage.

5. The transmitter of claim 1, wherein the wireless transmitter is a current-driven transmitter.

6. The transmitter of claim 1, wherein the wireless transmitter is enclosed in an insulating case.

7. A method of efficiently transmitting power wirelessly, comprising:
receiving AC power;
rectifying and filtering the AC power to provide DC power;
moderating the DC power to provide an input power; and
wirelessly transmitting the input power using a wireless transmitter comprising:
a transmitting coil with a center tap, a first side, and a second side;
an inductor coupling the input power to the center tap;
a capacitor coupled between the first and second side;
a first switch, coupled between the first side and ground;
a second switch, coupled between the second side and ground; and
a controller that operates the first and second switches in an adaptive self-resonance mode when the wireless transmitter is coupled to and transmits power to a wireless receiver that operates in the adaptive self-resonance mode;
wherein in the adaptive self-resonance mode, in each period of time of a plurality of successive periods of time, one of the first and second switches is on and the other one of the first and second switches is off, and a voltage across the other one of the first and second switches becomes non-zero in the period of time but returns to zero by the end of the period of time;
wherein the voltages across both of the first and second switches are zero at the end of each said period of time; and
wherein the first and second switches are both switched by the controller at the end of each said period of time, when the voltages across both of the first and second switches are zero.

8. The method of claim 7, wherein moderating the DC power includes providing a buck/boost to generate the input power with a voltage less than a voltage of the DC power.

9. The method of claim 7, further including boosting a voltage of the input power to provide a boosted input voltage and wherein wirelessly transmitting the input power includes wirelessly transmitting the input power.

10. The method of claim 7, wherein wirelessly transmitting the input power includes driving a current-fed transmitter.

11. The method of claim 7, wherein moderating the DC power comprises controlling a duty cycle of a regulator.

12. The method of claim 7, wherein rectifying the AC power comprises rectifying the AC power using a half-bridge rectifier.

13. The method of claim 7, wherein rectifying the AC power comprises rectifying the AC power using a full-bridge rectifier.

14. The method of claim 7, further comprising controlling a frequency at which the first and second switches are operated.

15. The method of claim 7, wherein:
the wireless transmitter is enclosed in an insulating case; and
an AC plug is integrated into the insulating case.

16. The transmitter of claim 1, wherein the controller controls a frequency at which the first and second switches are operated.

17. The transmitter of claim 6, wherein an AC plug is integrated into the insulating case.

18. The transmitter of claim 1 wherein in each said period of time, one of the first and second switches is off and the voltage across the one of the first and second switches is sinusoidal.

19. The method of claim 7 wherein in each said period of time, one of the first and second switches is off and the voltage across the one of the first and second switches is sinusoidal, and the other one of the first and second switches is on and the voltage across the other one of the first and second switches is zero.

20. The method of claim 7 wherein the controller switches the first and second switches when the voltage on the switch that is off becomes zero.

* * * * *